United States Patent [19]

Stacy

[11] 4,416,167
[45] Nov. 22, 1983

[54] CLUTCH DRIVE DIFFERENTIAL

[76] Inventor: Artis J. Stacy, 3008 Hoagland Ave., Fort Wayne, Ind. 46807

[21] Appl. No.: 216,377

[22] Filed: Dec. 15, 1980

[51] Int. Cl.³ ............................................. F16H 35/04
[52] U.S. Cl. ...................................................... 74/650
[58] Field of Search ...................... 74/650, 710, 710.5, 74/711

[56] References Cited

U.S. PATENT DOCUMENTS

| | | | |
|---|---|---|---|
| 1,743,060 | 1/1930 | Cartwright | 74/650 |
| 1,965,673 | 7/1934 | Sipprell et al. | 192/43 |
| 2,175,520 | 10/1939 | Fredrickson | 74/650 |
| 2,179,923 | 11/1939 | Lauaud | 74/650 |
| 2,397,673 | 4/1946 | Lewis | 180/24.03 |
| 2,651,214 | 9/1953 | Randall | 74/650 |
| 2,729,118 | 1/1956 | Emslie | 74/650 |
| 2,938,407 | 4/1960 | Nallinger et al. | 74/650 |
| 3,111,043 | 11/1963 | Panhard | 74/650 |
| 3,124,972 | 3/1964 | Seliger et al. | 74/650 |
| 3,700,082 | 10/1972 | Schwab | 74/650 |
| 3,732,750 | 5/1973 | Posh | 74/650 |
| 3,935,753 | 2/1976 | Williams | 74/650 |
| 4,290,321 | 9/1981 | Wilson | 74/711 |

FOREIGN PATENT DOCUMENTS 33470  5/1927  France ................................. 74/650

Primary Examiner—Leslie A. Braun
Assistant Examiner—L. D. Shannon, III
Attorney, Agent, or Firm—George A. Gust

[57] ABSTRACT

A clutch drive differential including a hollow drive casing provided at opposite ends with first and second coaxial shaft-receiving bores. First and second coaxial shafts are disposed in end-to-end relation and are rotatably received by said first and second bores, respectively. First and second drive wheels are disposed internally of the casing and are secured to but are axially moveable on the first and second shafts, respectively. The drive wheels are axially juxtaposed with adjacent radial faces being operatively frictionally engageable. A cam device is interposed between the first drive wheel and the adjacent inner end face of the casing for imparting rotation to and axial movement of the first drive wheel into operative frictional engagement with the second drive wheel in response to relative rotation between the casing and the first drive wheel. The opposite end face of the second wheel is operatively frictionally engageable with the other inner end face of the casing whereby relative rotation between the casing and the first wheel moves the latter axially into operative engagement with the second wheel causing the second wheel to move axially into operative engagement with the other casing end face thereby frictionally locking both drive wheels and casing together for rotation in unison.

9 Claims, 7 Drawing Figures

U.S. Patent Nov. 22, 1983 Sheet 1 of 3 4,416,167
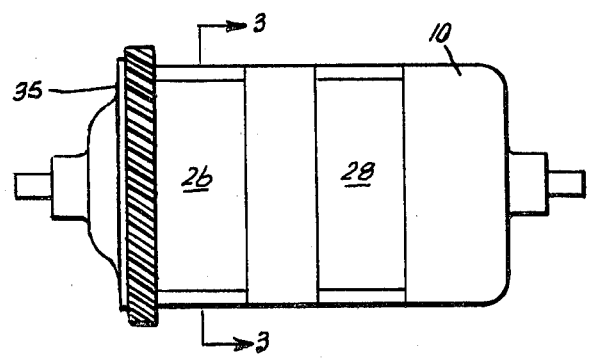
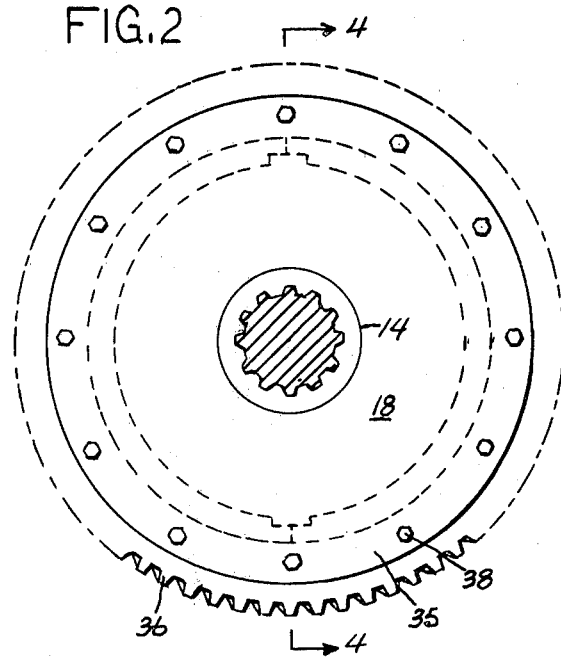
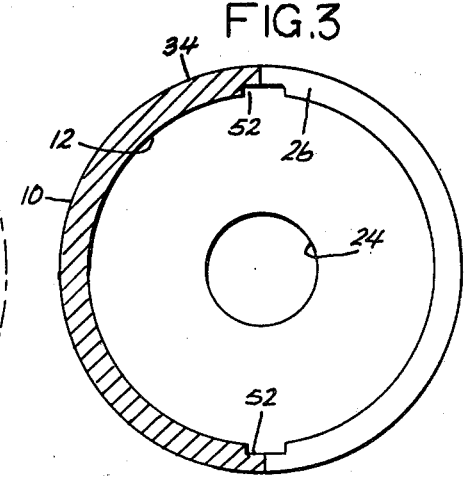
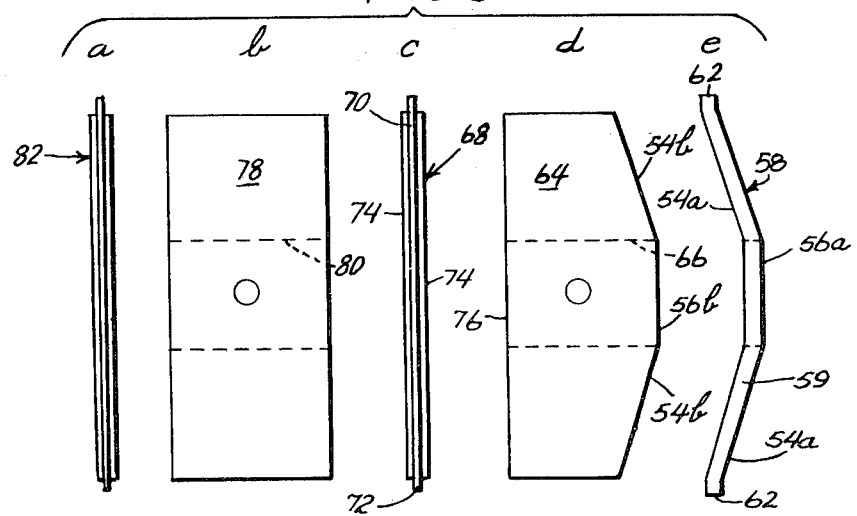

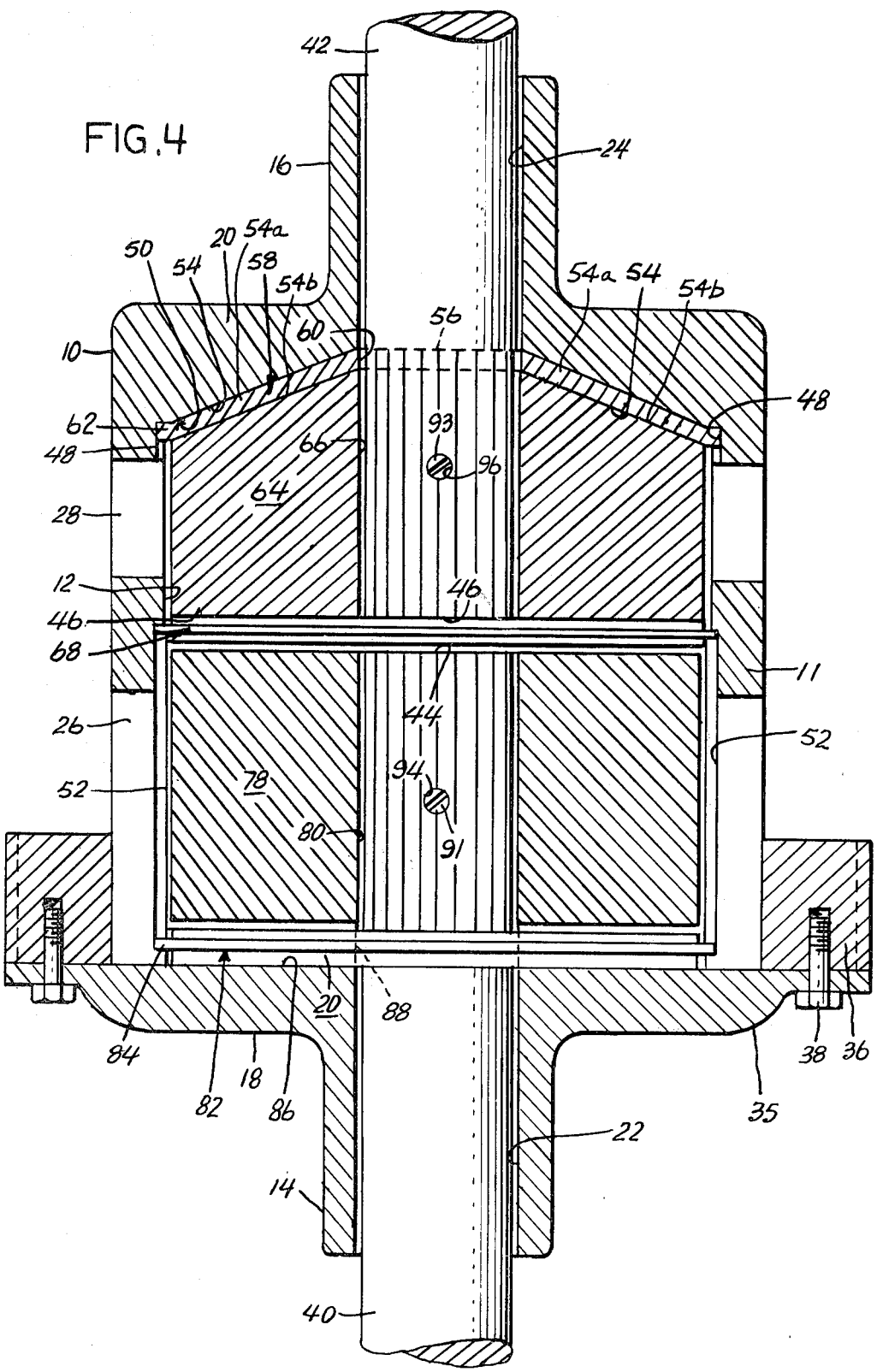

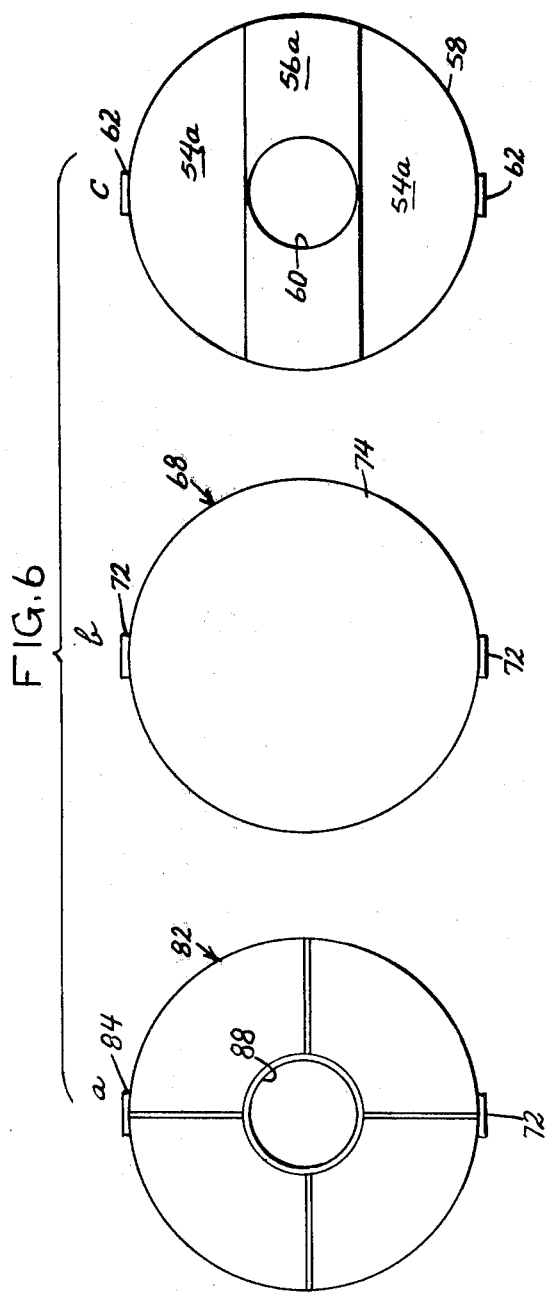
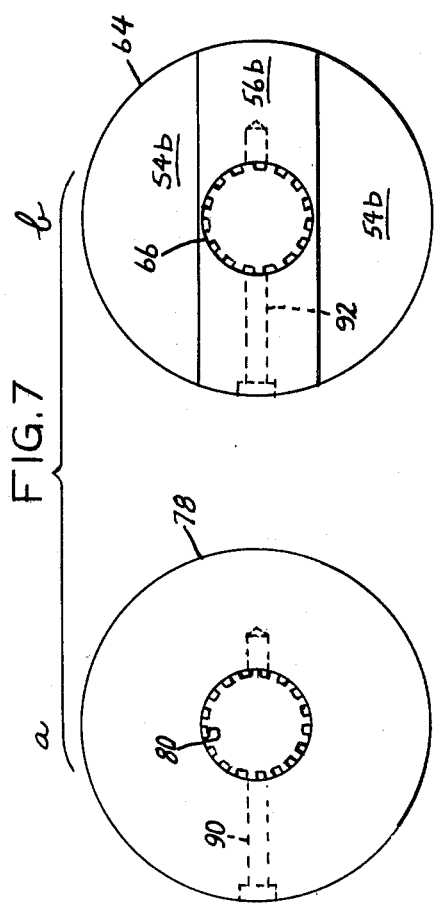

CLUTCH DRIVE DIFFERENTIAL

BACKGROUND OF THE INVENTION
1. Field of the Invention

The present invention relates to differentials for automotive vehicles and more particularly to such a differential employing frictionally engageable parts for controlling the rotation of two drive axles.
2. Description of the Prior Art Differentials for automotive vehicles are well known and have taken many different forms varying in complexity. Those used in the more common vehicles which utilize gearing or friction elements are relatively complex and difficult to service. Examples of such prior art arrangements are found in U.S. Pat. Nos. 1,743,060; 1,965,673; 2,175,520; 2,179,923; 2,397,673; 2,651,214; 2,729,118; 2,938,407 and 3,111,043.

SUMMARY OF THE INVENTION

This invention relates to a clutch drive differential which includes a hollow drive casing having opposite ends provided with first and second coaxial shaft-receiving bores. First and second coaxial shafts are disposed in end-to-end relation and are rotatably received by the aforesaid first and second bores, respectively. First and second drive wheels internally of the casing are secured to be are axially movable on the first and second shafts, respectively, but for rotation therewith. The drive wheels are axially juxtaposed with adjacent radial faces being operatively frictionally engageable. A cam device is interposed between the opposite face of the first drive wheel and the adjacent first inner end face of the casing for imparting rotation and axial movement of the first drive wheel into operative engagement with the second drive wheel in response to relative rotation between the casing and the first drive wheel. The opposite end face of the second wheel is operatively frictionally engageable with the adjacent second inner end face of the casing whereby relative rotation between the casing and the first wheel moves the latter axially into operative engagement with the second wheel causing the second wheel to move axially into operative engagement with the second casing end face thereby frictionally locking both the drive wheels and casing together for rotation in unison.

To facilitate assembling and servicing, the casing may be provided with an opening in one side of such size large enough to receive the drive wheels therethrough whereby such drive wheels and any other components that may be used may be assembled and disassembled through such opening.

Further components may include a first clutch plate interposed between the drive wheels and a second clutch plate interposed between the second drive wheel and the second casing face. The clutch plates preferably are keyed to the casing for rotation therewith.

The cam device preferably is in the form of mating inclined radial faces on both the first drive wheel and the first inner casing face, such radial faces being so disposed as to provide a driving connection between the casing and the first drive wheel and further to move the first drive wheel axially in response to relative rotation between the casing and the first drive wheel. Upon such axial movement, the drive wheels and clutch plates are frictionally locked together thereby to impart driving rotation to the axle shafts.

In view of the foregoing, it is an object of this invention to provide a clutch type locking differential which is simple in design, is composed of a minimum number of parts, may be easily serviced and is of rugged construction.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

In the drawings, FIG. 1 is a side view of an embodiment of this invention;

FIG. 2 is an end view;

FIG. 3 is a cross section of the casing only taken substantially along the section line 3—3 of FIG. 1;

FIG. 4 is a longitudinal sectional view taken substantially along section line 4—4 of FIG. 2;

FIG. 5 is a series of side views of the drive wheels and other components;

FIG. 6 is a series of end views of the clutch plates and buffer plate as shown in FIG. 5; and FIG. 7 are end views of the two drive wheels of FIG. 5.

DESCRIPTION OF THE PREFERRED EMBODIMENT

Referring to the drawings, the differential of this invention includes a cylindrical casing 10 having a cylindrically machined inner bearing surface 12. Two oppositely extending cylindrical bearing extensions 14 and 16 coaxially project from the opposite ends of casing 10 and are integrally formed therewith. Such bearing extensions 14 and 16 as well as the casing end portions 18 and 20 have two bores 22 and 24 machined therein which are coaxial and preferably of the same size.

Two half-cylindrical openings 26 and 28 are provided in the side of casing 10 as shown. An annular flange portion 35 is provided on the casing end 18 for the purpose of mounting a ring gear 36, threaded fasteners 38 passing through the flange portion 35 and into the ring gear 36 as shown.

Two splined axle shafts 40 and 42 are rotatably received by the bearing bores 22 and 24, respectively, with the inner ends 44 and 46 thereof being adjacent but slightly spaced apart as shown. The shafts 40 and 42 are adapted to be mounted in suitable bearings on a vehicle and to carry vehicle-supporting wheels (not shown).

The internal bearing surface 12 of the casing 10 has provided therein two diametrically opposed key slots 48 adjacent the inner end face 50 of the casing 10. Two other diametrically opposed and axially extending key slots 52 are provided in the casing 10, these as shown in FIG. 3 being machined into the casing 10 itself. The purpose of these key slots 48 and 52 will be explained in the following.

The inner end face 50 of the casing 10 is formed with two inclined radial surfaces 54 which extend outwardly from a diametral flat portion 56, this end face 50 being fitted with a substantially identically shaped buffer plate 58 made of hardened steel. The purpose of the buffer plate 58 is to protect the end face 50 of the casing as will become apparent from the description that follows. A description of the buffer plate 58 will further serve to explain the particular configuration of the end face 50.

For this purpose, reference is made to FIGS. 5e and 6c. The plate 58 is stamped or otherwise formed to the shape shown, the inclined radial portions 54a conforming to the inclined surfaces 54 and the flat diametral portion 56a conforming to the diametral surface 56. The plate 58 is provided with a central opening 60 which fits over the shaft 42 with clearance, the plate 58 normally being positioned in mating relation with the shaped end face 50.

The plate 58 is also provided with key portions 62 on the outer edges as shown. These key portions 62 are slidably received by the key slots 48 in the casing 10 with clearance, the purpose being to affix the plate 58 to the casing 10 for rotation therewith.

A first drive wheel 64 which is generally cylindrical has a coaxial bore 66 machined to be slidably received on the end of the axle shaft 42. The bore 66 has splines which mate with the splines on the axle shaft so as to be rotatable with the latter but movable axially thereon. The peripheral surface of the drive wheel 64 is machined to a size slightly smaller than bearing surface 12 thereby to have bearing engagement therewith.

As shown more clearly in FIGS. 5d and 7b, the right-hand end of the drive wheel 64 has a shape which complements that of the buffer plate 58, more specifically having inclined radial faces 54b and a diametral, flat surface 56b. As shown in FIG. 4, this end surface of the wheel 64 has mating engagement with the adjacent face of the buffer plate 58.

A circular clutch plate 68 as shown in FIGS. 5c and 6b consists of a metal disc 70 having two key portions 72 on diametrically opposite edges as shown and segments of suitable clutch lining material 74 as shown on the opposite faces. This clutch plate 68 is fitted into the casing 12 with the key portions 72 slidably fitting into the key slots 52. The key portions 72 are optional, however, and may be omitted. Otherwise, the clutch plate 68 is disposed immediately adjacent and parallel to the end face 76 of the wheel 64. In the embodiment shown, this end face 76 is planar and perpendicular to the axis of the shaft 42.

It will be noted that the clutch plate 68 is solid with the left end 46 of the axle shaft 42 being disposed parallel to the end face 76 of the wheel 64.

Another drive wheel 78 of cylindrical shape is also provided with a coaxial bore 80 which fits the splines on the axle shaft 40 such that this shaft and the drive wheel 78 are rotatably connected with the drive wheel 78 having limited axial movement thereon. The opposite end faces of this drive wheel 78 are flat and perpendicular to the axis of the shaft 40. The drive wheel 78 is of such size that the outer peripheral surface has slight clearance but bearing engagement with the inner casing surface 12. The righthand end 44 of the shaft 40 is disposed flush with the adjacent end face of the drive wheel 78. As clearly shown in FIG. 4, the clutch plate 68 is interposed in parallelism between the adjacent end faces of the two drive wheels 64 and 78.

Another clutch plate 82 identically formed to that of the clutch plate 68 has key portions 84 which are also slidably received by the casing slots 52. This plate 82 is interposed between the flat inner end surface 86 of the housing 10 and the left end face of the drive wheel 78 as shown. A hole 88 in the clutch plate 82 fits over the axle shaft 40 with clearance.

For retaining the two shafts 40 and 42 assembled to the respective drive wheels, suitable pins 91 and 93 are threadedly received by radial bores 90 and 92 in the two wheels and slidably fit clearance radial openings 94 and 96 in the two axle shafts 40 and 42, respectively. The shafts 40, 42 and the respective drive wheels 78, 64 are therefore connected together and can move independently axially relative to casing 10 by a limited amount.

The mechanism thus far described is assembled as follows. The casing 10 has the ring gear 36, the retaining plate 33 and cover plates 30 and 32 removed. The buffer plate 58 is first inserted through the side opening 26 and moved into position against the casing face 50 in mating engagement therewith with the key portion 62 inserted into the key slots 48. Next the drive wheel 64 is inserted through the opening 26 and moved toward the right into mating engagement with the buffer plate 58 as shown. The axle shaft 42 is inserted through the bore 24 and the opening 66 in the drive wheel 64 in such position that the radial bore 92 is aligned with the radial opening 96. The pin 93 is threaded into the bore 92 until it passes through the shaft opening 96 as shown, this assembly being performed through the side opening 28 in casing 10.

Next, the clutch plate 68 is inserted through the opening 26 and moved into position against the drive wheel 64 with the key portions 72 slidably received by the key slots 52. The drive wheel 78 is inserted through the opening 26 in position against the clutch plate 68 as shown. The clutch plate 82 is likewise inserted through the opening 26 and is positioned against the left face 86 of the casing with the key portions 84 slidably received in the key slots 52. The axle shaft 40 is fitted into the bore 22 of the casing and the bores 80 and 88 and of the clutch plate 82 and drive wheel 78 to the position shown. The pin 91 is assembled in the same manner as explained in connection with drive wheel 64. The ring gear 36 is next telescoped over the casing 10 and secured in place by means of the threaded fasteners 38.

Prior to inserting shafts 40 and 42 into the casing 10 but after insertion of the drive wheels 64, 78 and clutch plates 68, 82, the casing 10 is placed within a conventional differential housing (not shown) having shaft openings which also receive shafts 40 and 42, respectively. This housing has bearings which mount the bearing stubs 14 and 16 on the casing 10 such that the casing 10 may rotate relative to and within the housing. The housing has a cover plate which when removed permits insertion of the pre-assembled casing 10 into the housing. Next, the shafts 40 and 42 are inserted through the respective shaft openings in the housing to be assembled to its respective drive wheels 64, 78 and clutch plates 68 and 82 as above described. Lastly, the cover plate and sealing gasket are installed on the housing to cover the side opening thereof. The housing otherwise is sealed in a conventional manner to receive and retain differential oil.

As noted in FIG. 4, the openings 26 and 28 are spaced to provide a section 11 of casing therebetween. The width of this section 11 is large enough to overlap the adjacent end portions of drive wheels 64 and 78 to retain these drive wheels in assembly during operation of the differential.

From the foregoing it will be appreciated that the differential of this invention may be assembled and disassembled with ease through the openings 26 and 28 in the casing 10. Thus a minimum of time, effort and trouble is involved in servicing.

In use, the differential is mounted on a vehicle in a conventional manner with the load-supporting wheels mounted on the outboard ends of the axle shafts 40 and 42. The differential itself (FIG. 4) is mounted within the housing (not shown but described above) having sealed bearing openings which receive for rotation the bearing extensions 14 and 16. Also included within this housing is a pinion gear (not shown) meshed with ring gear 36, a drive shaft being secured to this drive gear and projecting through another sealed bearing opening in the housing. The housing normally contains a suitable clutch or differential fluid to such depth (a third full) as will freely enter casing 10 through openings 26 and 28. Thus, the drive wheels 64 and 78 and the clutch plates 68 and 82 run in such fluid. The housing is suitably secured to the frame of the vehicle to provide a stationary bearing mount for the differential.

By reason of the close fitting tolerances of the drive wheels 64 and 78 with the bearing surface 12 in the casing 10, the casing 10 becomes a connection and load support for the inner, adjacent ends of the axle shafts 40 and 42. Since there is some relative rotation at times between the casing 10 and the two wheels 64 and 78, the clearances with the bearing surface 12 must be sufficient to accomodate this rotation.

As mounted on the vehicle, the drive gear on the drive shaft of the vehicle meshes with the ring gear 36 to impart rotation to the casing 10. Assuming that the vehicle is in the form of a conventional automobile, and first considering that the automobile is to be moved straight ahead, power applied to the drive shaft results in rotating the casing 10. Since the axle shaft 42 and the drive wheel 64 are at the moment stationary, the casing 10 rotates slightly relative thereto. This relative rotation causes the cam faces 54 to become misaligned thereby forcing the drive wheel 64 toward the left on the splined axle shaft 42. Since the axial clearances between the clutch plates and the drive wheels are initially made small, the leftward movement of the drive wheel 64 compresses the clutch plate 68 against the drive wheel 78 and this wheel in turn against the clutch plate 82 and the end face 86 of the casing 10. This effectively frictionally locks the drive wheel 64, the clutch plate 68, the drive wheel 78 and the clutch plate 82 to the casing 10 resulting in simultaneous rotation of all of these parts as well as the axle shafts 40 and 42. The differential thus frictionally locks the axle shafts 42 for simultaneous rotation.

Upon rounding a curve in one direction, one of the wheels and its axle shaft will rotate faster than the other. Assuming that the axle shaft 40 tends to rotate slower than the shaft 42, as differential torque is developed between the casing 10 and drive wheels 64, 78, this results in slight relative rotation of the drive wheel 64 with respect to the casing 10 in a direction opposite to that which initially produced the camming force described above. This tends to bring the inclined faces 54, 54a and 54b into mating alignment thereby resulting in slight axial separation of the drive wheels 64 and 78, the wheel 64 rotates relative to casing 10 in a direction toward mating alignment. The frictional locking force between the drive wheels 64 and 78 is thus sufficiently broken to permit these wheels to rotate independently. The same action occurs if a curve is rounded in the other direction. Stated further, consider that during straight-ahead movement the casing 10 is the driving element. The same rotation is imparted to the wheels 64, 78. Now assuming rounding a curve, shaft 40 meets resistance in rotating, in other words, tends to rotate more slowly than shaft 42, this slowing torque being imparted by wheel 78 to casing 10: the casing 10 in effect slows slightly relative to shaft 42 and wheel 64. The casing 10 being thus slowed, with respect to wheel 64, rotates the cam faces 54, 54a and 54b an increment toward alignment. Wheel 64 thereby moves axially an increment slightly away from wheel 78 breaking the clutch engagement of all the wheels and clutch plates and allowing relative movement between the two wheels 64, 78.

Between acceleration, deceleration and rounding a curve, the camming action can shift rotationally oppositely. For rounding a curve, this opposite shifting permits the necessary axial spreading with consequent slippage and relative rotation between wheel elements 64 and 78 to accommodate the speed differential between the inner and outer wheels.

In further explanation, the camming effect occurs upon momentary relative rotation between casing 10 and drive wheel 64, which can be in either direction depending upon the relative speeds thereof. For example, for one condition, consider the vehicle to be stationary with no rotational drive being imparted to the casing 10 via ring gear 36. Upon applying normal accelerating drive, the drive shaft and pinion (which is engaged with ring gear 36) undergo acceleration to start casing 10 rotating. At this moment, the drive wheel 64 is stationary, so casing 10 starts rotating relative thereto. This results in the cam surfaces 54 and 54b on both casing 10 and wheel 64 rotating relatively, or in other words to "misalign", which thereby wedges wheel 64 toward wheel 78 and wheel 78 into tight, operative engagement with the adjacent face of casing 10. With the three parts 10, 64 and 78 thus cammed or wedged together, they rotate in unison and rotate axle shafts 40, 42 therewith. The vehicle is thus moving at a selected speed.

Opposite relative rotation occurs upon vehicle deceleration, this resulting when driving power is removed from the drive shaft. As the vehicle coasts, the vehicle wheels, of course, continue to rotate and carry with them the two axle shafts 40 and 42. The vehicle engine and drive shaft tend to drop in speed to idle condition. This results in the casing 10 (which is drivingly connected to the engine via ring gear 36) slowing relative to the wheel 64 since the later rotates with the vehicle wheel which continues to rotate at the vehicle speed. The cam faces on the casing 10 and wheel 64 now rotate oppositely until misaligned and cammed to an extent at which wheel 64 operatively engages wheel 78 and wheel 78 operatively engages casing 10. This engagement is not as forceful as during acceleration and may involve some slippage especially in view of the fluid contained within casing 10. Thus is explained how the camming elements 10 and 64 may rotate into and out of camming alignment.

Further with reference to the camming elements (casing 10 and drive wheel 64) re-engaging or camming together after the vehicle has rounded a curve, the axle shafts 40 and 42 and the vehicle wheels thereon rotate at equal speeds as the vehicle now moves straightaway. As the vehicle is accelerated, the casing 10 is momentarily caused to rotate faster than drive wheel 64. This results in relative rotation of the cam surfaces on wheel 64 and casing 10 with consequent misalignment which operatively wedges wheel 64 against wheel 78 and casing 10. The driving force now applied to casing 10 is concurrently applied to both axles 40 and 42. For deceleration of the vehicle after rounding a curve, straightaway motion results in the casing 10 rotating momentarily slower than wheel 64 since the vehicle wheel is connected to the latter. The cam surfaces once again become misaligned producing the wedging action which couples axle shafts 40 and 42 together. Thus, the cam surfaces may re-engage after a curve has been rounded.

Typical material for the lining segments 74 on the clutch plates is A-155 Series Material, Paper Type, Asbestos free, manufactured by D.A.B. Industries, Inc., 466 Stephenson Highway, Troy, Mich. 46804.

The differential of this invention is of simple design, utilizes a minimum number of components and may be easily assembled and disassembled. By reason of the simple construction, the cost of fabrication is correspondingly low. The differential has a relatively long wear life thereby leading to reliability in operation.

While there have been described above the principles of this invention in connection with specific apparatus, it is to be clearly understood that this description is made only by way of example and not as a limitation to the scope of the invention.

What is claimed is:

1. A clutch drive differential comprising a hollow drive casing having opposite ends provided with first and second coaxial shaft receiving bores, first and second coaxial shafts disposed in end-to-end relation rotatably received by said first and second bores, respectively, first and second drive wheels internally of said casing secured to but axially movable on said first and second shafts, respectively, for rotation therewith, said drive wheels being axially juxtaposed, a clutch plate keyed to said casing for axial movement and interposed between adjacent radial faces of said drive wheels and being operatively frictionally engageable therewith, cam means interposed between the opposite end face of said first drive wheel and the adjacent first inner end face of said casing for imparting rotation to said first drive wheel and axial movement of said first drive wheel into operative engagement with said second drive wheel in response to relative rotation between said casing and said first drive wheel, the opposite end face of said second wheel being frictionally operatively engageable with the adjacent second inner end face of said casing, whereby relative rotation between said casing and said first wheel moves the latter axially into operative engagement with said second wheel causing the second drive wheel to move axially into operative engagement with said second casing end face and thereby frictionally rotationally locking both drive wheels and casing together for rotation in unison.

2. The differential of claim 1 wherein said cam means includes a first inclined flat radial face on said first casing end face and an inclined radial face of complementary shape on the opposite end of said first drive wheel, whereby engagement of said inclined faces joins the casing and first drive wheel for concurrent rotation and relative rotation therebetween causes axial separation thereof to force both drive wheels into operative engagement.

3. The differential of claim 2 including a first clutch plate interposed between both said drive wheels and a second clutch plate interposed between said second drive wheel and said second casing face.

4. The differential of claim 3 wherein the adjacent faces of said drive wheels are planar and normal to the axes thereof, the opposite face of said second wheel and said second casing face also being planar and normal to said axes.

5. The differential of claim 3 wherein said drive wheels are secured to said shafts by splines, an opening in one side of said casing large enough to receive said drive wheels and clutch plates therethrough whereby said drive wheels and clutch plates may be assembled and disassembled through said opening.

6. The differential of claim 2 wherein said cam means includes second inclined flat radial faces on both said first drive wheel and said first inner casing face with such inclined flat radial faces on each being radially spaced in symmetry with a diametral flat portion normal to the axes of said wheels therebetween.

7. The differential of claim 6 including a second clutch plate interposed between said second drive wheel and said second casing face, the adjacent faces of said drive wheels being planar and normal to the axes thereof, the opposite face of said second wheel and said second casing face also being planar and normal to said axes, said drive wheels being secured to said shafts by splines, an opening in one side of said casing large enough to receive said drive wheels and clutch plates therethrough whereby said drive wheels and clutch plates may be assembled and disassembled through said opening.

8. The differential of claim 7 including a buffer plate keyed to said casing and interposed between said first casing end face and the adjacent face of said first wheel, said buffer plate having a shape complementary thereto.

9. The differential of claim 7 wherein the interior of said casing and said drive wheels are cylindrical and of substantially equal diameter and further have load-bearing engagement.

* * * * *

UNITED STATES PATENT AND TRADEMARK OFFICE
CERTIFICATE OF CORRECTION

PATENT NO. : 4,416,167
DATED : November 22, 1983
INVENTOR(S) : Artis J. Stacy

It is certified that error appears in the above—identified patent and that said Letters Patent is hereby corrected as shown below:

Col. 5, line 32, after "54" insert --,54a and 54b --.

Signed and Sealed this

Twenty-fourth Day of July 1984

[SEAL]

Attest:

GERALD J. MOSSINGHOFF

*Attesting Officer*   *Commissioner of Patents and Trademarks*